United States Patent [19]
Bauer

[11] Patent Number: 5,993,107
[45] Date of Patent: Nov. 30, 1999

[54] PAVER BLOCK EDGING SYSTEM

[76] Inventor: Kirk W. Bauer, 20417 N. Thor Rd., Colbert, Wash. 99005

[21] Appl. No.: 08/996,087

[22] Filed: Dec. 22, 1997

[51] Int. Cl.$^6$ ........................................... E01C 5/00
[52] U.S. Cl. ..................... 404/43; 404/34; 404/36; 404/40; 52/311.2; 52/386
[58] Field of Search ................... 404/29, 33, 34, 404/36, 37, 43; 52/386, 387, 384, 102, 103, 4, 311.2; 135/118

[56] References Cited

U.S. PATENT DOCUMENTS

| | | | |
|---|---|---|---|
| 318,126 | 5/1885 | Marsh | 52/387 |
| 334,101 | 4/1919 | Kealy | 52/386 |
| 421,742 | 2/1890 | Marsh | 52/387 |
| 830,313 | 9/1906 | Fenn | 52/387 |
| 1,454,293 | 5/1923 | Liptak | 52/387 |
| 1,513,184 | 6/1924 | Reagan | 404/37 |
| 1,954,424 | 4/1934 | Otwell | 47/33 |
| 2,193,425 | 3/1940 | Lake | 52/102 |
| 3,520,095 | 7/1970 | Jonason et al. | 52/387 |
| 3,740,913 | 6/1973 | Musser | 52/387 |
| 3,916,563 | 11/1975 | Tedesh | 47/33 |
| 3,964,224 | 6/1976 | Christensen | 52/387 |
| 4,125,964 | 11/1978 | Waggoner | 47/33 |
| 4,135,338 | 1/1979 | Malavasi | 52/387 |
| 4,267,680 | 5/1981 | Delattre | 52/384 |
| 4,671,699 | 6/1987 | Roach | 404/41 |
| 4,907,909 | 3/1990 | Ruckstuhl | 404/37 |
| 5,006,011 | 4/1991 | Hiyashi | 404/37 |
| 5,121,569 | 6/1992 | Thomas | 47/33 |
| 5,240,343 | 8/1993 | Strobl, Jr. | 404/7 |
| 5,390,457 | 2/1995 | Sjolander | 52/387 |
| 5,421,118 | 6/1995 | Bauer | 47/33 |

OTHER PUBLICATIONS

Snap Edge Brochure, "Plastic Edge Restraint for Concrete Pavers and Patio Slabs," date unknown.
Permaloc Brochure, "StructurEdge," Date unknown.

*Primary Examiner*—Robert E. Pezzuto
*Assistant Examiner*—Raymond W Addie
*Attorney, Agent, or Firm*—Wells, St. John, Roberts, Gregory & Matkin, P.S.

[57] ABSTRACT

A paver block edging system is described for positioning a row of edge blocks over a support surface. The edging system includes an elongated channel including a floor formed to receive and support a paver block. A connector is provided on the channel to be releasably received over a bendable member that is not part of the system. The connector releasably secures the channel to the bendable member and angularly orients the channel relative to the bendable member. The bendable member may thus be used to determine a line along which a number of the channels are oriented to receive paver blocks.

17 Claims, 6 Drawing Sheets

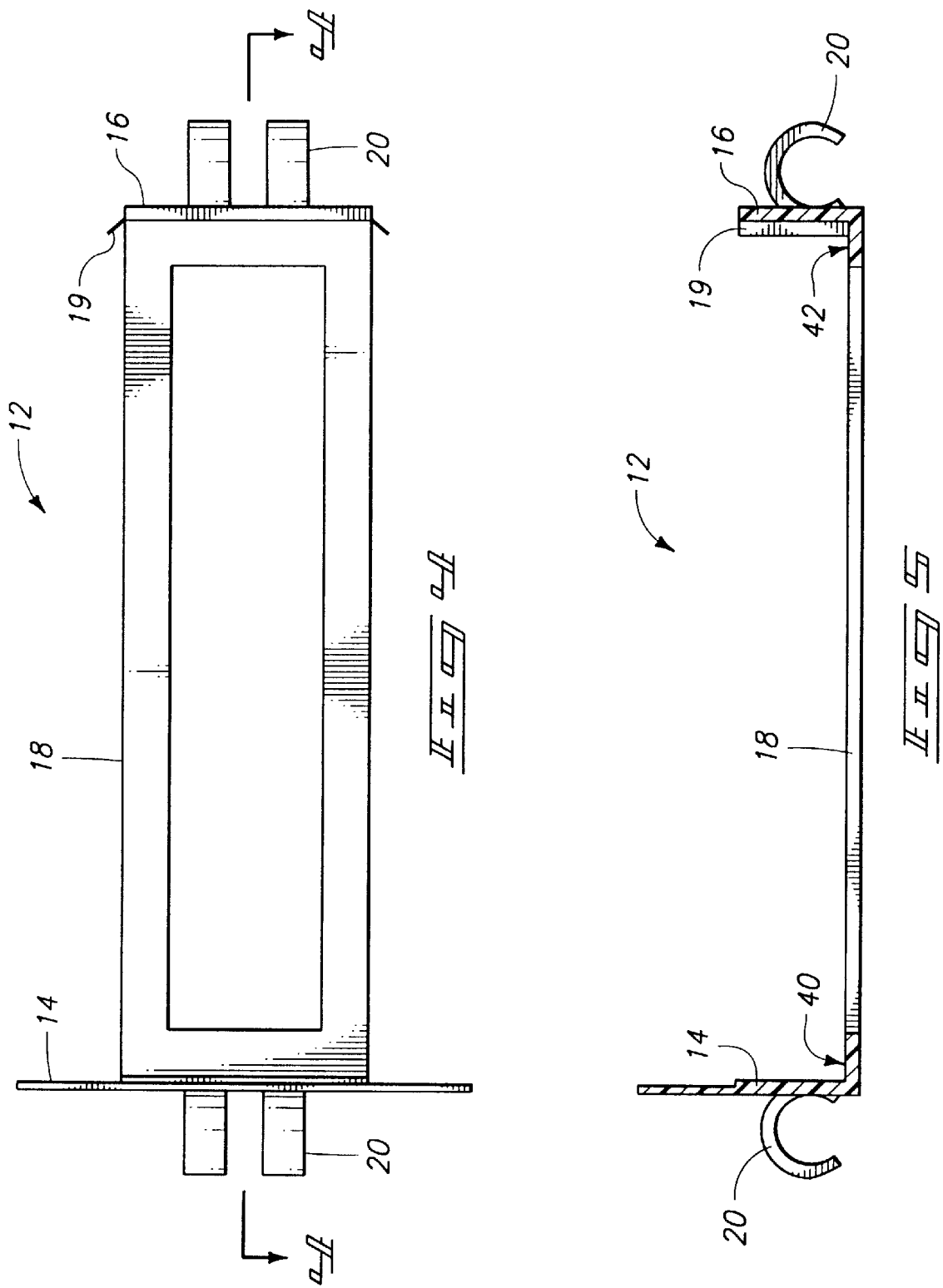

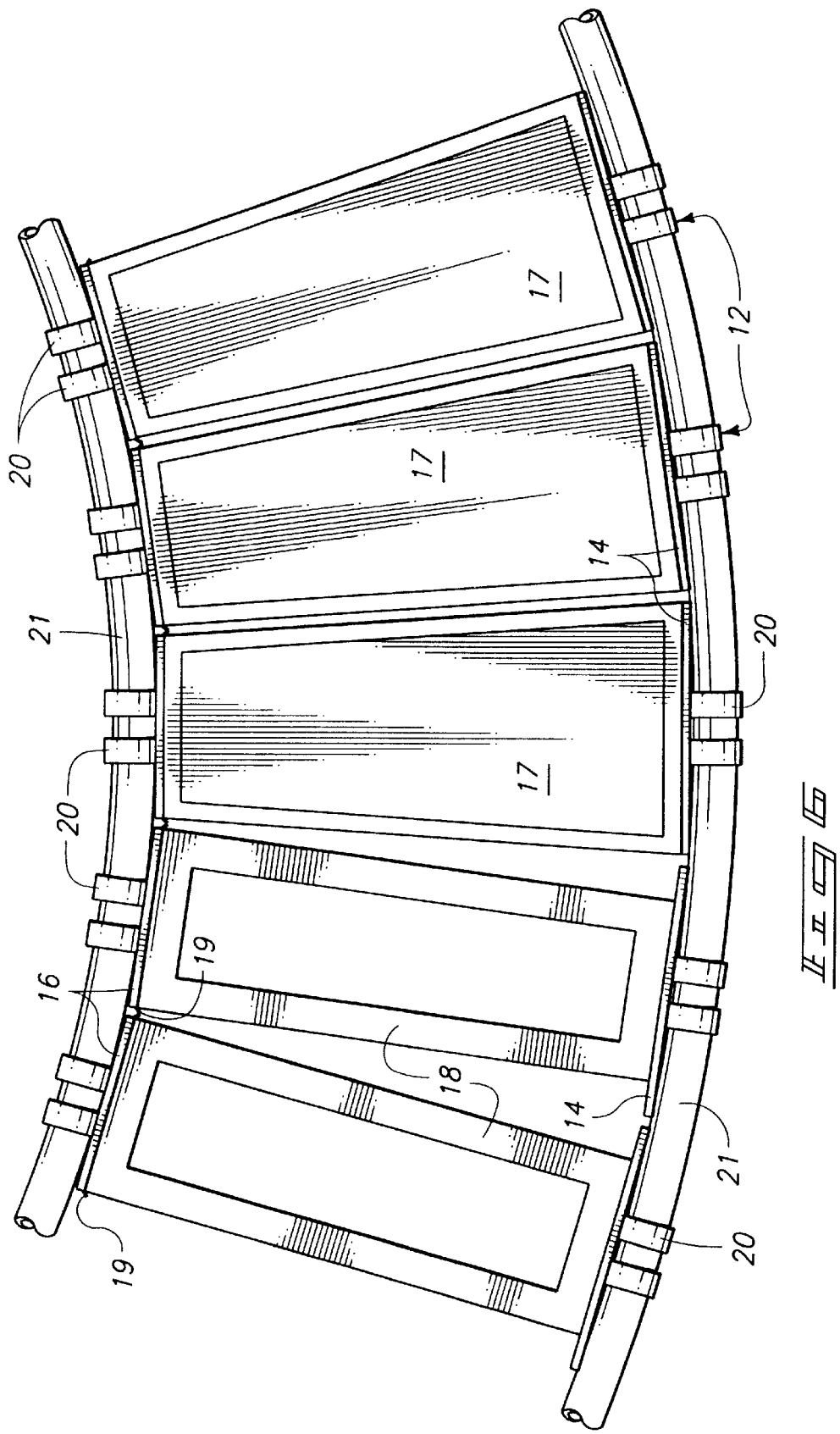

PAVER BLOCK EDGING SYSTEM

TECHNICAL FIELD

This invention relates to paver block edging devices which hold and position paver blocks along a desired reference line.

BACKGROUND OF THE INVENTION

Various edging devices have been used in attempts to define permanent grass boundaries in lawns. Such edging devices are intended to serve one or more of three general functions.

Firstly, the primary purpose of an edging system is to resist encroachment of grass into flower beds or other areas where grass is not desired.

Secondly, some types of edging devices provide a solid surface, at grass level, for lawn mower wheels. This can be a significant convenience.

Finally, some edging devices are considered to be ornamental, improving the appearance of a lawn and garden.

Elongated wood pieces or strips such as two-by-fours or railroad ties are often used as edging devices. In the case of two-by-fours, they are generally anchored or retained by stakes. Railroad ties are usually retained solely by their own weight.

The primary advantage of wood is low cost. Depending upon the width of material used, wood edging devices also provide a surface against which lawn mower wheels can ride. However, untreated wood tends to rot and decay. Furthermore, wood edging devices tend to loosen and move. Many wood edging systems thus need replacement or re-setting after several years.

Thin strips or plates of metal or plastic are also used as lawn edging. Strip material tends to last longer than wood. However, such devices generally provide no support for lawn mower wheels. In fact, after repeated mowing the weight and movement of a lawn mower over such metal or plastic strips can tend to move or dislodge them from their desired location. Furthermore, thin strips are simply not substantial enough to separate materials from each other. For instance, grass often grows right over the top of thin strips, sometimes dislodging or loosening them in the process. Bark and rock are also easily thrown from one side to the other of thin strips. Another disadvantage of these edging devices is that they provide no ornamental function.

A continuously-poured curb-like concrete edge is an alternative to the above devices that is becoming increasingly popular. A poured concrete edge tends to be more solid and permanent than the devices described above. In addition, it provides a solid edge surface for lawn mowing and is considered by many to be aesthetically pleasing. The primary disadvantage of concrete edging systems is their high cost. Another disadvantage is that ground heaving from seasonal ground freezing and thawing can result in cracking. Ground heaving can even, in some cases, dislodge or move poured concrete edges.

Discrete concrete blocks are sometimes used instead of continuously-poured concrete edges. Blocks are lower in cost and can be easily installed by a home-owner, while possessing several of the advantages of continuously-poured concrete edges. For instance, concrete blocks are aesthetically pleasing and provide a convenient surface for lawn mowers. A significant disadvantage of discrete concrete blocks, however, is their relative instability. Ground heaving and vegetation growth tend to dislodge concrete blocks from their initial aligned positions. Foot traffic and lawn mower wheels can also shift such blocks-especially in wet conditions where the underlying ground is soft.

The invention described below is an edging system which exploits the advantages of discrete concrete blocks. However, the resulting concrete block paver block edge also has the advantage of poured concrete edges. The disadvantages of more conventional concrete block edging systems are avoided by positioning and restraining the blocks in such a way as to resist their movement and migration. A concrete block paver block edge in accordance with the invention is significantly less expensive than a poured concrete paver block edge and only slightly more expensive than a lawn edge formed by a conventional installation of discrete concrete blocks.

BRIEF DESCRIPTION OF THE DRAWINGS

Preferred embodiments of the invention are described below with reference to the following accompanying drawings, in which:

FIG. 4 is a top plan view of a preferred channel member;

FIG. 5 is a sectional view taken along line 4—4 in FIG. 4;

FIG. 6 is a top view of an edging system such as the one shown in FIG. 1 showing the edging system in a curved configuration;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
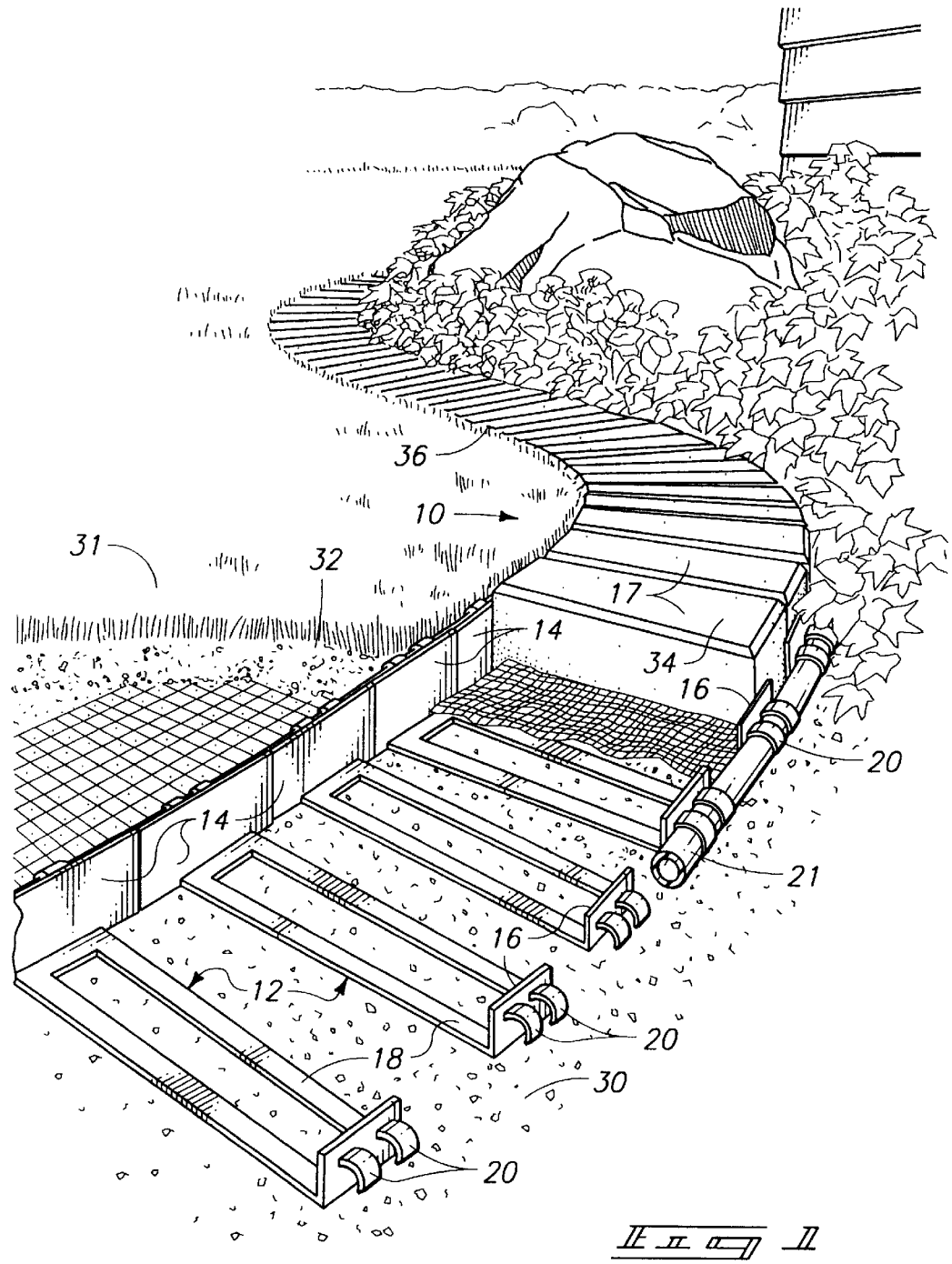
FIG. 1 is a perspective view of a paver block edging system in accordance with a preferred embodiment of the invention, partially placed along a lawn edge.

FIG. 1 shows a paver block edging system in accordance with a preferred embodiment of the invention, generally designated by the reference numeral 10. The general function of edging system 10 is to position a single row of paver blocks over a surface such as underlying soil along a paver block or planter edge.

In a preferred form, the present edging system 10 includes an elongated restraining channel 12. It is advantageous that the channel be formed of an injection molded plastic that is flexible and that is resistant to corrosion. The channel includes a first or inner sidewall and an opposed second or outer sidewall 16. The sidewalls are transversely spaced from each other to receive and hold a plurality of paver blocks 17 therebetween.

Channel 12 includes a channel floor 18 which extends between sidewalls 14 and 16 to support channel 12 along a support surface such as a prepared underlying soil at a sub-surface elevation. The floor 18 thus lies against the support surface with the sidewalls 14, 15 projecting upwardly to receive a paver block 17. The floor is preferably flat and may include a central opening to minimize the amount of material required to form the channel.

Figure 2:
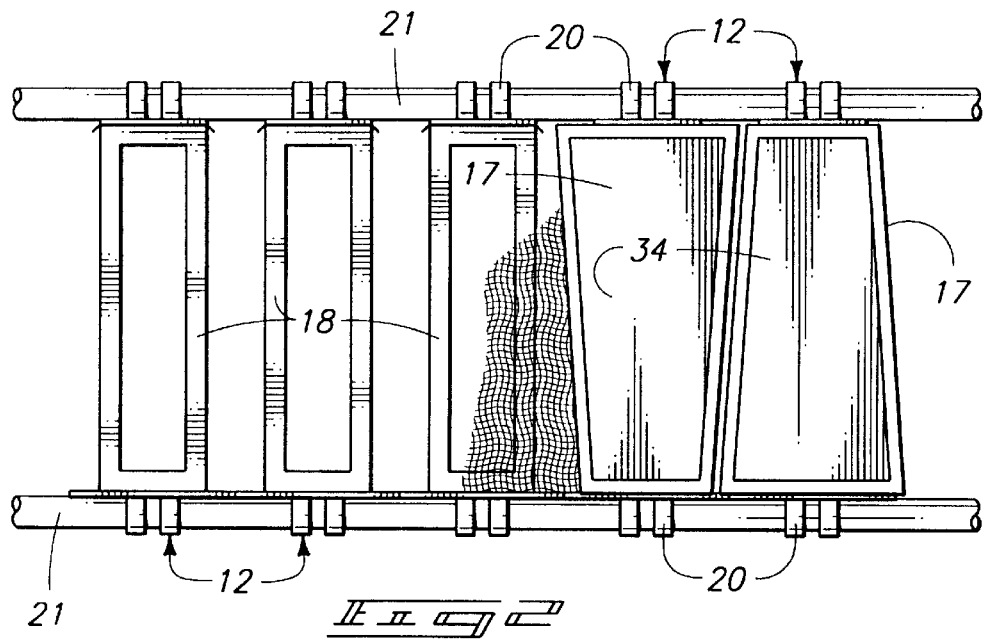
FIG. 2 is a plan view of an assembly using the preferred block edging system.

As shown in FIG. 2, channel 12 is installed atop underlying soil 30 beneath an upper surface 31 of an adjoining lawn grass or sod area 32. A single row of paver blocks 17 is received between sidewalls 14 and 16 of restraining channel 12. Edge blocks 17 have upper surfaces 34 which are positioned slightly above upper surface 31 of lawn grass area 32. Elongated channel 12 holds and restrains the row of edge blocks 17 relative to the underlying soil to define a lawn edge or reference line 36 along the paver blocks 17.

Figure 3:
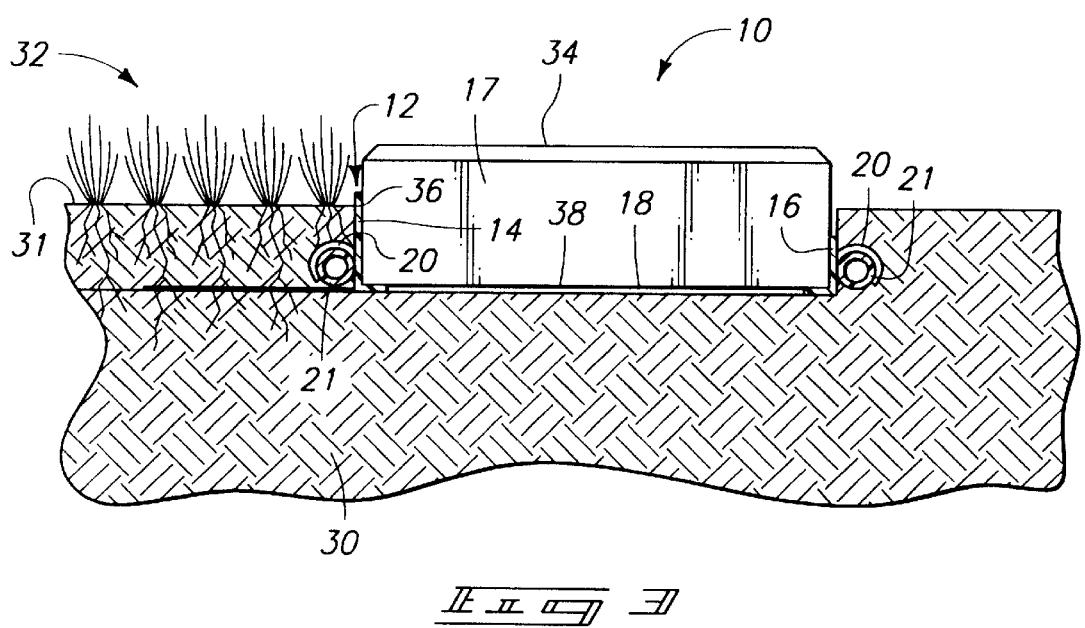
FIG. 3 is a transverse sectional view of the preferred system in place along a lawn and with a paver block in place.

Referring now to FIGS. 1, 3, and 4, sidewalls 14 and 16 extend across the opposed ends of the channel 12. The first sidewall 14 has a length dimension that is approximately equal to the maximum width dimension of a paver block 17. The second sidewall is shorter than the first sidewall and has a length dimension approximately equal to the minimum width dimension of the paver block. The channel floor 18 is relatively narrow to enable the channel to be angularly positioned relative to an adjacent channel as may be understood from viewing FIG. 6.

Figure 8:
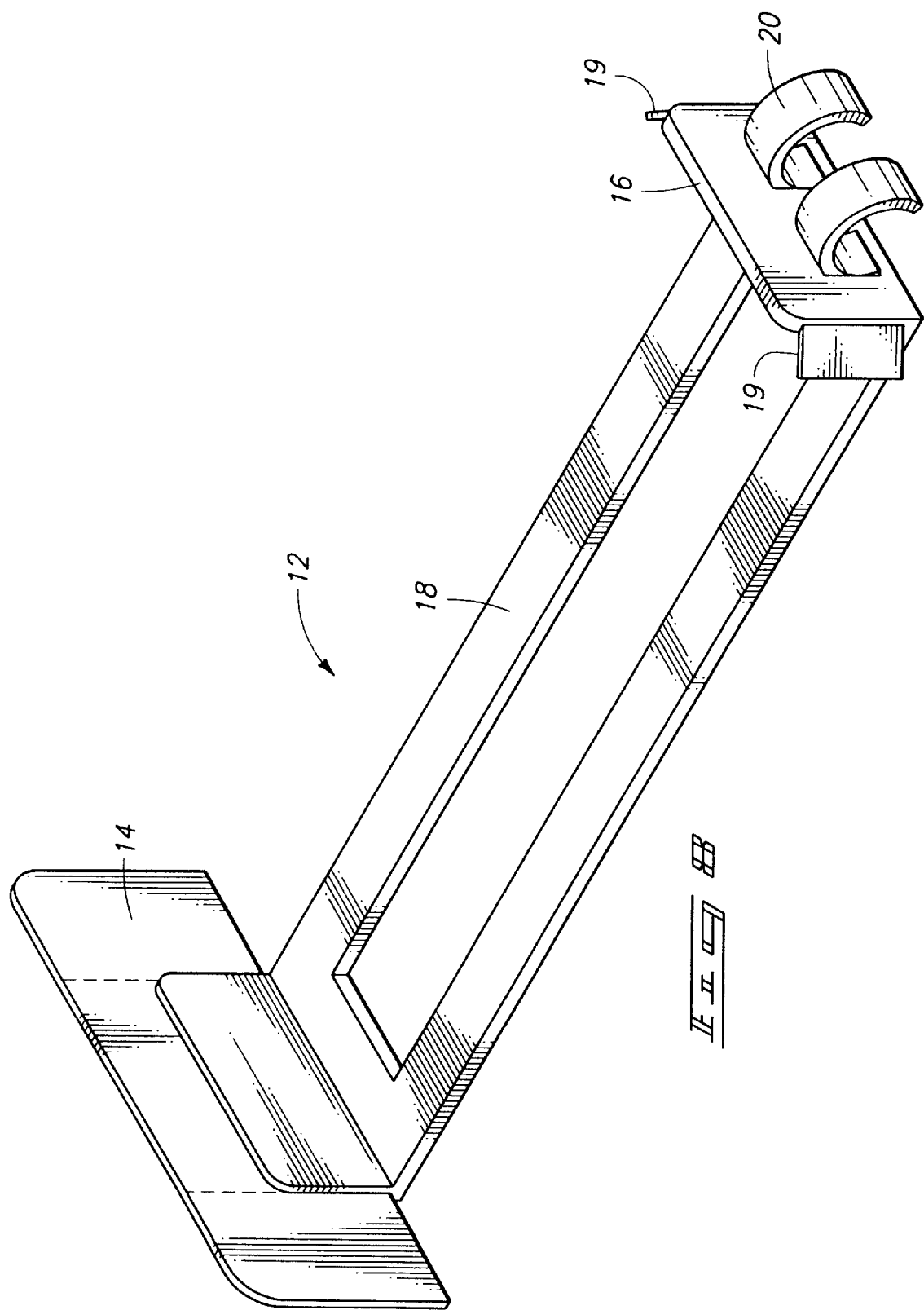
FIG. 8 is a perspective view showing the preferred channel member.

At least a portion of channel sidewall 14 (FIG. 8) is scored to enable portions to be separated therefrom as needed when the edging row forms an inside corner (when the sidewalls 14 are situated at the inside of a bend). This allows the restraining channel to be conformed to or bent along a curved lawn edge.

In a preferred form, wing sections 19 are provided on at least one of the sidewalls, preferably the second sidewall 16. The wing sections 19 may be integral with the sidewall 16, and project substantially angularly toward the remaining sidewall 14. The wings allow for slight differences in paver block length and provide gripping action against a paver block received between the sidewalls.

At least one connector 20 is provided on each of the channels 12, for selective attachment to a bendable member 21. The bendable member 21 is not part of the channel, and is preferably formed of a standard length of, say pvc tubing. Such tubing is inexpensive, and is easily joined or severed to conform to any configuration and any desired length. The bendable member 21 is used to initially define the course the edging is to take, and to provide an anchor point for the various channels 12 used to receive a row of paver blocks 17. The connectors 20 angularly orient the channels relative to the bendable member 21.

As shown in FIGS. 1, 2, and 6, two bendable members may be used, with connectors 20 in a succession of channels 12 joining the channels between the bendable members. This configuration is desirable to provide maximum stability for the channels along a desired path or course.

In a preferred form, the connector 20 is comprised of two pairs of clips that are integral with each associated channel member 12. It is most preferred that the clips be integral with the sidewalls 14, 16. Thus one set of clips is provided on sidewall 14 and another set is provided on sidewall 16.

The clips are formed complementary to the cross-sectional shape of the bendable member (see FIG. 3) and will extend over-center with respect to the centerline of the bendable member to hold the channels in place. The clips are sufficiently resilient to snap over and secure the channel, yet will allow the channel to slide along the bendable member or to be removed therefrom.

It can thus be seen that a number of the channels 12 can be readily attached to the bendable member in a row to receive a succession of paver blocks 17. Further, the row can be straight, as shown partially by FIG. 2. or curved as shown in FIGS. 1 and 6. The resiliency of the clips will allow the channels to be placed in curved, straight, angular, or any combination of these orientations in three dimensions according to the path desired.

Figure 7:
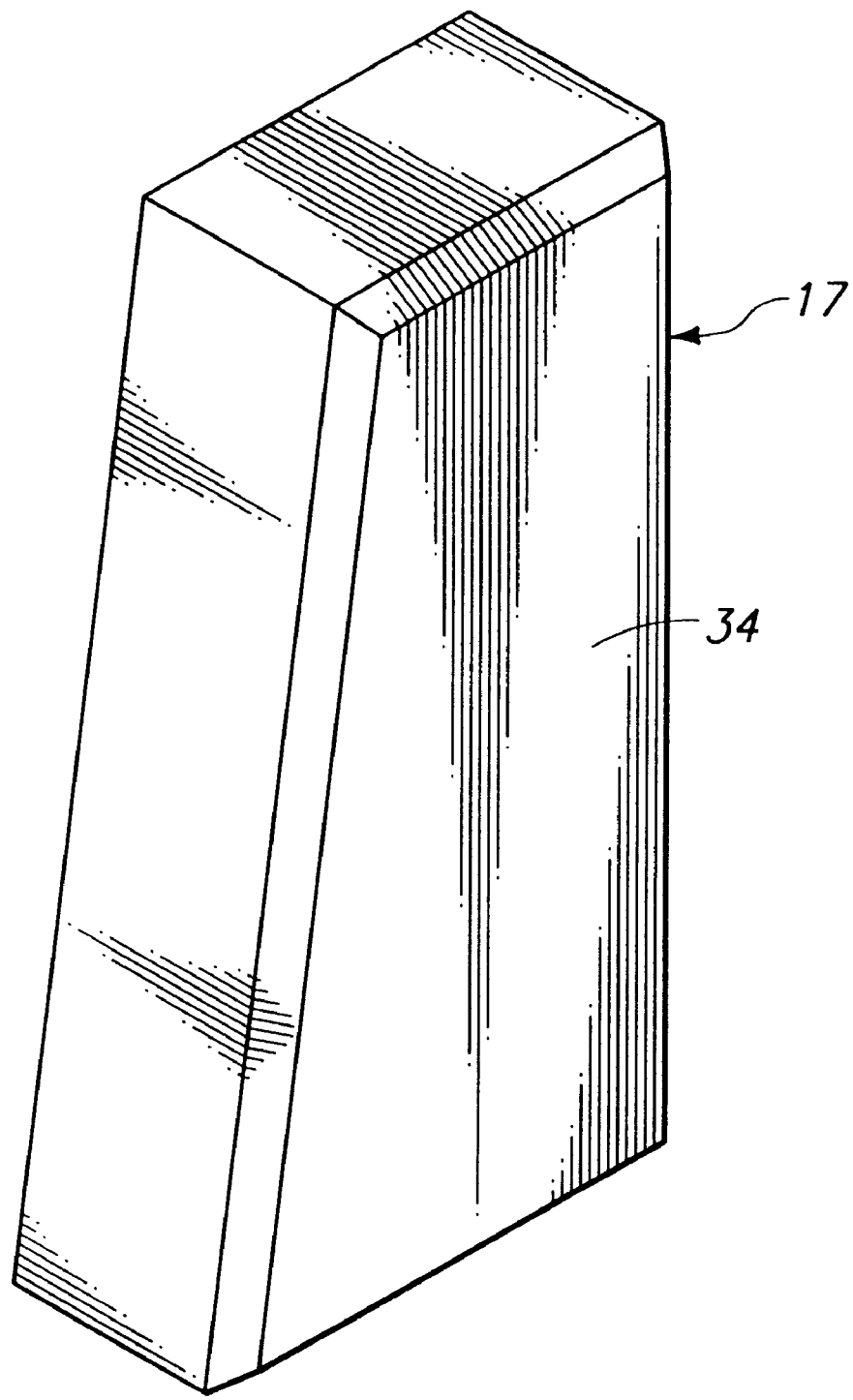
FIG. 7 is a perspective top view of a tapered concrete edge block suitable for use with a preferred embodiment of the invention.

Although many types of concrete blocks could be advantageously used with the retaining channel described above, the edging system described herein is particularly advantageous when used in combination with concrete edge blocks 17 as illustrated in FIG. 7. Viewed from the top, each edge block 17 has a wide end and a narrow end. The block sides taper uniformly from the wide end to the narrow end, although this shape is not necessary for use with the present system. In fact the paver could be rectangular, or rhomboid in shape, according to design considerations. However, some form of uniformly tapered configuration is most desired, since the tapers can be used to form curves when used together as shown in FIGS. 1 and 6 or in alternate formation to produce straight lines as shown in FIG. 2. Of course the blocks may be used in different combined orientations to combine straight and curved sections.

The sequence can be varied to produce curves of different radii. Furthermore, curved row segments can be interspersed with straight row segments and vice versa. Serpentine rows can be created in this fashion. In addition, rectangular blocks, not shown, can be used and interspersed with angled blocks.

In the preferred embodiment shown, the crosswise dimensions of the blocks are selected to establish a block pitch, when the blocks are laid in a straight row, which is equal to the pitch of floor along each channel 12. More generally, it is convenient to select component dimensions so that the pitch of the floor is an integral multiple of the blocks when the blocks are laid in a straight row. Nevertheless, blocks having different pitches can also be used.

Preparation of the site where edging is to be installed is similar to the steps performed prior to installation of a conventional paver block edge using discrete concrete blocks. However, with the present process the task of laying the blocks will be significantly simplified.

In preparation for installation of the present system, the area is prepared by removing or rolling back an area of sod or surface materials that is approximately equal to the width of the edging to be laid. This step may be aided by first placing the desired length of bendable member 21 along the surface to be edged. The member can be used as a guide, defining the path of the pavers to be laid before installing the present channels.

Once the surface is prepared, the member 21 can easily be anchored in position using pegs or spikes driven along side or through the member to anchor the member in the desired position.

Now several channels 12 may be clipped to the anchored member at several points along its length. These channels can be used to position a second bendable member, which may be attached to the clips at the remote ends of the channels. The several channels will space the second bendable member the correct distance from the anchored member, and allow the second member to be positioned parallel to the anchored member.

If desired, a conventional fabric material may be placed on the surface between the bendable members to retard plant growth between pavers. Next, a number of the channels are clipped between the secured bendable members. The channels are placed so the sidewalls 14 are facing outwardly and are preferably butted one against another as shown in FIGS. 1 and 2 to prevent incursion of grass or other plants.

As the channels are placed, it may become desirable to either overlap portions of adjoining sidewalls 14 or to remove separable sections of the side walls. This situation may occur at inside bends.

Paver blocks may be placed in the successive channels as they are clipped to the bendable members. Alternatively, several or all of the channels can be placed prior to placement of the blocks. Whichever mode is chosen, the blocks are placed according to the path defined by the channels and the secured bendable members. A straight line of blocks is achieved by alternating blocks as shown in FIG. 2, and alternating inside or outside bends are accomplished by orienting the short ends of the blocks toward the center of the bend. Placement of the blocks is accomplished quickly and easily simply by placing them between the sidewalls of the previously positioned channels.

In an existing lawn, the grass sod is then placed over the bendable members and back against the sidewalls 14 of the channels. Soil is backfilled over the inward bendable member and against the inner sidewalls 16 of the channels. In a new lawn, soil is backfilled against both sidewalls of the channels and grass is planted adjacent the adjoining sidewalls 14.

The invention described creates a paver block edge which is a significant improvement over the prior art. It possesses many of the advantages of a poured concrete lawn edge. Particularly, the resulting paver block edge is extremely stable due to the restraining influence of the channels secured on two sides by the elongated bendable members. It is also attractive, resulting in a brick-like appearance in which several different colors can be used. Furthermore, the paver block edging system described above provides a wide and solid surface for a lawn mower along the outer periphery of a yard. In contrast to poured concrete, however, the preferred embodiment of the invention is extremely simple and inexpensive to install. While poured concrete edges typically require professional installation and specialized equipment, the paver block edge described above can be easily installed by a homeowner with common household tools.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A paver block edging system for positioning paver blocks over an underlying surface along a prescribed line defined by elongated bendable members, the edging system comprising:

a plurality of elongated channels, each of said elongated channels having first and second opposed sidewalls spaced apart by a floor, the sidewalls being spaced from each other to receive and hold a paver block therebetween;

a plurality of connectors positioned above the floor and configured to engage and clamp the channel to the bendable members to secure the elongated channel in a selected spatial and angular relation to the bendable member; and wherein the floor of each channel includes opposed ends, and wherein one connector is situated adjacent each one of said opposed ends;

whereby a number of said channels may be connected between the bendable members to hold a row of paver blocks in an orientation determined by the bendable members.

2. A paver block edging system as recited by claim 1, further comprising wing sections on at least one of the sidewalls of each channel projecting substantially angularly toward the remaining sidewall to provide gripping action against a paver block received between the sidewalls.

3. A paver block edging system as recited by claim 1, wherein the at least one of the connectors on each channel is situated on at least one of the sidewalls.

4. A paver block edging system as recited by claim 1, wherein the connectors are resilient clips.

5. A paver block edging system as recited by claim 1, wherein the connectors are integral with the channels.

6. A paver block edging system as recited by claim 1, wherein at least one of said plurality of connector is integral with one of the sidewalls on each of the channels.

7. A paver block edging system as recited by claim 1, wherein each connector is comprised of a resilient clip.

8. A paver block edging system for positioning a row of paver blocks over a surface along a line defined by elongated bendable members, the edging system comprising:

a plurality of elongated channels, each of said elongated channels including opposed ends and configured to receive and hold a paver block;

each channel having a floor to support the channel over the underlying surface;

a connector on each of the opposed ends and disposed above the floor and configured to be attached to the bendable members;

whereby a number of said channels may be mounted by way of said connectors to the bendable members to hold a row of paver blocks in an orientation determined by the bendable members.

9. A paver block edging system as recited by claim 8, wherein each channel includes a sidewall situated at one end of the floor.

10. A paver block edging system as recited by claim 8, wherein each channel includes opposed sidewalls and wherein the connectors are positioned on the sidewalls.

11. A paver block edging system as recited by claim 8, wherein each channel includes a sidewall and wherein the sidewall includes a severable portion that may be selectively removed from the sidewall.

12. A paver block receiving channel for releasable connection to an elongated bendable member that is not part of the paver block receiving channel, comprising:

a floor extending between opposed ends and configured to receive and mount a paver block; and a connector at each of the opposed ends joined to and disposed above the floor and configured to be clipped over the elongated bendable member to releasably connect the paver block receiving channel to the elongated bendable member in such a manner that the paver block receiving channel is oriented at a selected angle to the bendable member.

13. A paver block recieving channel as recited by claim 12, further comprising a sidewall integrally joined to the floor.

14. A paver block receiving channel as recited by claim 12, further comprising a pair of opposed sidewalls joined to the floor at the opposed ends and spaced apart thereon, and wherein each connector is comprised of at least one resilient clip on one of the sidewalls.

15. A paver block receiving channel as recited by claim 12, wherein the connectors are each comprised of a resilient clip including a resilient tine formed in an inverted "U" shaped configuration.

16. A paver block edging process for positioning a row of paver blocks over a surface along a reference line defined by at a pair of elongated bendable members, the edging process comprising the steps of:

positioning the elongated bendable members in spaced relation along the surface and along the reference line;

providing a plurality of channels, each configured to receive and hold a paver block, the channel including a floor to support the channel over the surface, and connectors at each opposed channel ends on each of the channels and above the floor, the connectors being configured to be attached to the bendable members;

mounting a number of said channels by way of said connectors to the bendable members such that the channels extend along said reference line and the bendable members are substantially parallel to the reference line; and placing a row of paver blocks in the channels.

17. A paver block edging system for attachment to a bendable member along a prescribed reference line, comprising:

a plurality of elongated channels, each of said elongated channels configured to receive and hold a paver block;

each channel having a floor to support the channel over the underlying surface;

each channel further having first and second opposed sidewalls spaced apart by the floor to receive and hold a paver block therebetween;

a connector on each of the sidewalls situated above the floor and configured to be attached to the bendable member;

whereby said channels may be mountable by way of said connectors to the bendable member to hold a row of paver blocks in an orientation determined by the bendable member;

a row of paver blocks received in the channel members, with each paver block in the row including a maximum width dimension along the reference line; and wherein each first sidewall includes a length dimension measured along the reference line that is substantially equal to the maximum width dimension of a paver block.

* * * * *